United States Patent [19]
Winningstad

[11] Patent Number: 5,886,739
[45] Date of Patent: Mar. 23, 1999

[54] PORTABLE AUTOMATIC TRACKING VIDEO RECORDING SYSTEM

[76] Inventor: C. Norman Winningstad, 2225 NW. Pacific St., Newport, Oreg. 97365-2152

[21] Appl. No.: 146,525

[22] Filed: Nov. 1, 1993

[51] Int. Cl.$^6$ ........................................................ H04N 7/18
[52] U.S. Cl. ........................... 348/158; 348/151; 348/115; 348/838
[58] Field of Search ..................... 348/211, 115, 348/158, 376, 121, 838, 214, 51, 53, 77, 370, 373, 151; H04N 7/18

[56] References Cited

U.S. PATENT DOCUMENTS

| | | | |
|---|---|---|---|
| 3,542,457 | 11/1970 | Balding | 351/7 |
| 4,051,534 | 9/1977 | Dukich et al. | 348/211 |
| 4,398,799 | 8/1983 | Swift | 348/115 |
| 4,516,157 | 5/1985 | Campbell | 348/158 |
| 4,797,736 | 1/1989 | Kloots et al. | 348/376 |
| 5,091,719 | 2/1992 | Beamon, III | 348/115 |
| 5,189,512 | 2/1993 | Cameron et al. | 348/115 |

*Primary Examiner*—Bryan Tung
*Assistant Examiner*—Vu Le
*Attorney, Agent, or Firm*—Marger Johnson & McCollom

[57] ABSTRACT

A portable video recording system allows an operator to record objects and events while at the same time keeping the person's hands free, and body relatively unencumbered for movement, while performing tasks. The video recording system has separate components that are attached at various locations on the operator to distribute weight of the video recording system over the operator. The video recording system is attached to an operator so that images within the operator's line of sight and within the operator's hearing range are automatically tracked and recorded.

18 Claims, 2 Drawing Sheets

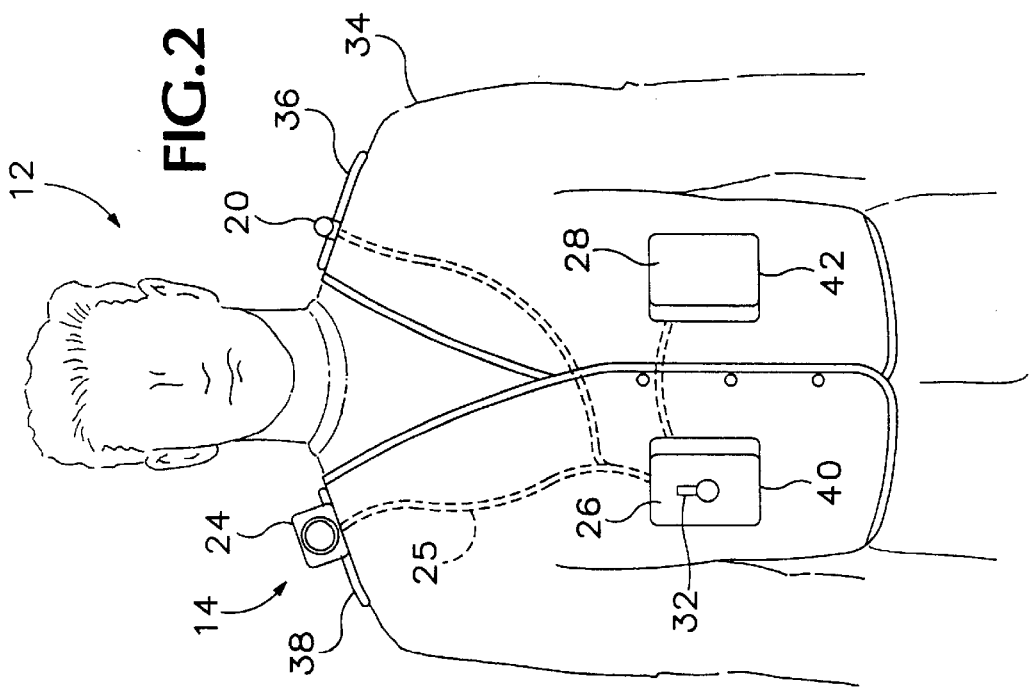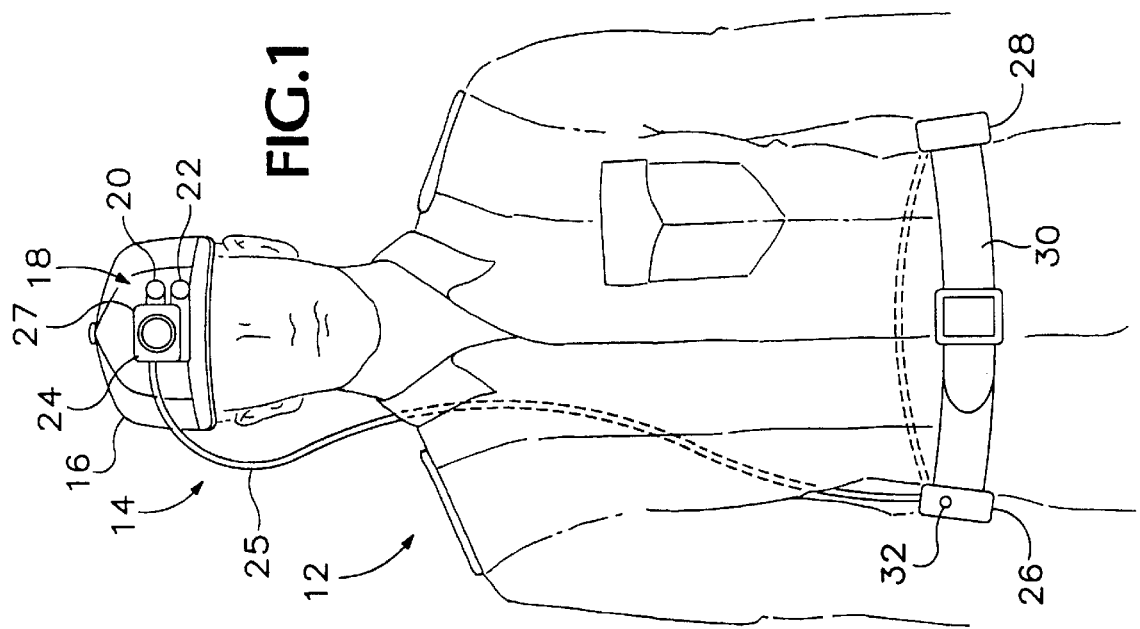

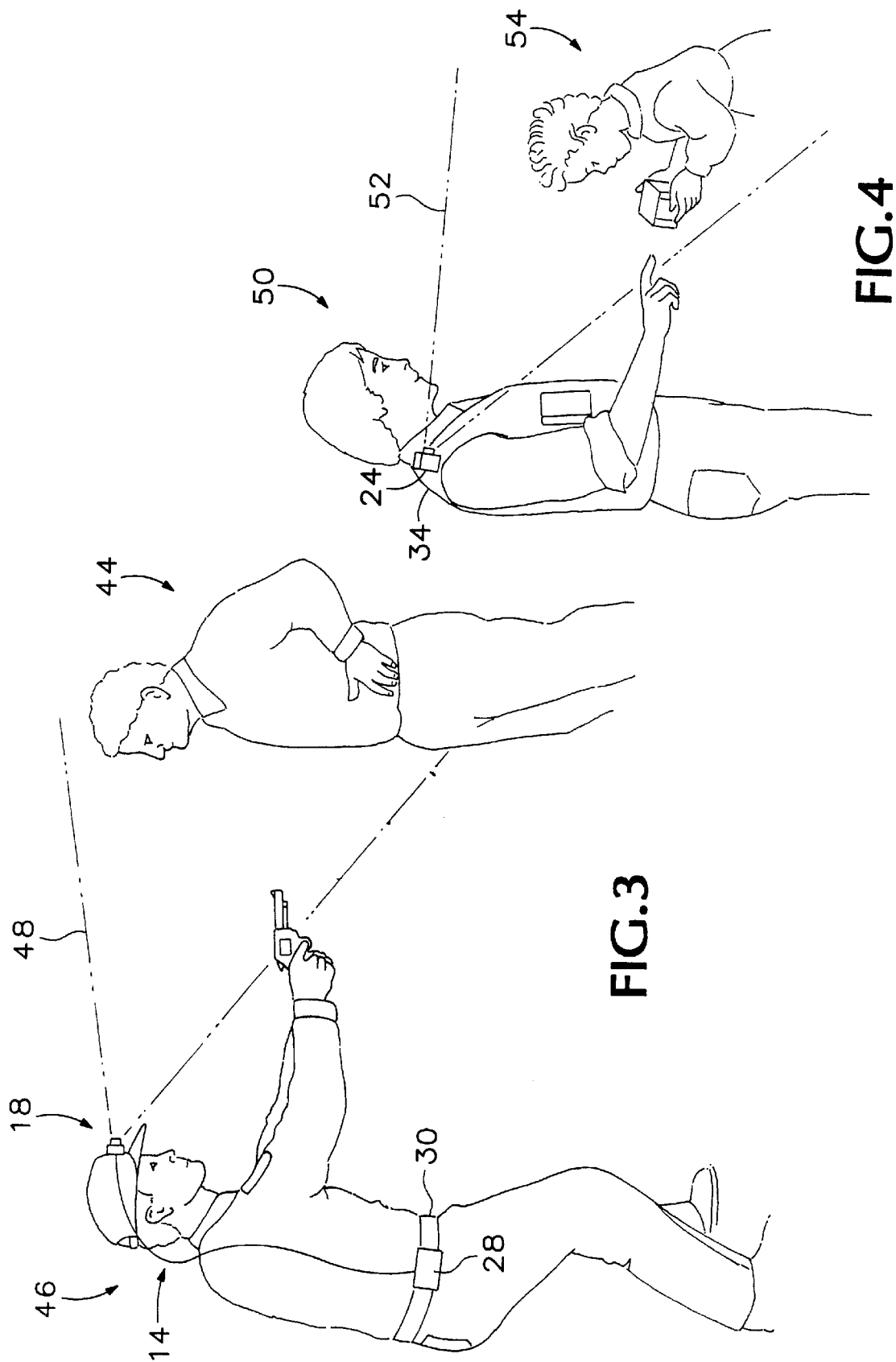

PORTABLE AUTOMATIC TRACKING VIDEO RECORDING SYSTEM

BACKGROUND OF THE INVENTION

This invention relates generally to audio and video recording equipment and more particularly to a portable video recording system that automatically tracks and records objects and events viewed by an operator.

The size of video recorders have become consistently smaller over the last few years making video recorders easier to carry and handle. For example, U.S. Pat. No. 4,625,243 to Takubo shows a video recorder small enough to be held and pointed with a single adult hand. While easy to carry, portable video recorders still require the operator to hold the camera with one hand while at the same time looking though a focusing lens or viewfinder to properly aim the camera at an object or event. In addition, video recording systems can only operate for a certain limited amount of time. Therefore, present video recording systems can not operate or maintain a "ready to shoot" state for extended periods without having to continuously replace batteries.

Because it is very difficult to move or perform additional tasks while recording, an operator typically records objects while standing or sitting in a stationary position. However, in many situations it would be preferable for the operator to move freely while operating the video recording system. For example, the operator currently cannot play with a child while at the same time recording the child's actions.

Although video recording systems are also significantly lighter than cameras made several years earlier, it is still difficult to carry the entire video recording system for extended periods time while maintaining the unit in a "ready to shoot" state. For example, U.S. Pat. No. 4,561,576 to Lowe et al., shows a video equipment bag that is used for carrying video equipment. The video camera is placed in a carrying bag or backpack when not in use. The camera operator, however, is still required to hold and aim the camera in one arm while recording. The operator is, therefore, not capable of extracting the video camera from the bag then activating and focusing the camera in time to record sudden events.

To maintain a "ready to shoot" condition, the video camera in Lowe et al. must be constantly carried in the hand of the operator and usually left in an "on" state. However, after an extended period of time, the operator's hand becomes tired and the video camera must be either transferred to another hand or placed back in the equipment bag. In addition, since the video camera must be held and aimed in one hand, the operator has reduced capacity to perform other tasks. For example, the operator cannot operate machinery or provide services while operating the video camera.

U.S. Pat. No. 5,012,335 to Cohodar shows a method for automatically recording the actions of a police officer. The video recorder system includes a camera located inside a police vehicle that tracks a transmission signal emitted from a police officer. The video recorder system in Cohodar, however, has an obstructed view when the police officer moves to areas not directly viewable from the windows of the police vehicle. In addition, if the police officer travels a substantial distance from the police car, the video camera can no longer record the policeman's activities.

Accordingly, a need remains for a portable video and audio recording system that can effectively record events while at the same keeping the arms and legs of the video camera operator free to perform other tasks and activities.

SUMMARY OF THE INVENTION

It is, therefore, an object of the invention to automatically monitor and record events within the viewing range of the video recording system operator.

Another object of the invention is to increase mobility and capacity to perform other activities while operating a video recording system.

Still another object of the invention is to moderate aggressive activity that occurs when a police officer confronts a suspect.

A further object of the invention is to increase the amount of time that a video recording system can be operated and maintained in a "ready to shoot" condition.

One aspect of the invention is a portable video recording system that allows an operator to record objects and events while at the same time keeping hands and eyes free to perform other tasks. The video recording system has separate components that are attached at various locations on the video recording system operator. By attaching the components at different locations, the weight of the system is distributed, thereby reducing the burden of carrying the system and increasing overall operator mobility.

The portable video recording system may be used by policemen to verify events that occur during police operations. An indicator light is located on either the police officer's helmet or uniform to indicate that the recording unit is presently activated. Because a suspect knows that all actions both physical and verbal are being recorded, the suspect is less likely to initiate aggressive actions or offensive verbal comments toward the officer. Thus, the portable video recording system serves as a moderator to prevent altercations during police operations.

Alternatively, the video recording system may be used by emergency medical personnel to record events while treating patients. Thus, a video and audio record of the patient and the type of treatment provided to the patient is saved for future reference, for example, to further evaluate and provide medical treatment to the patient. The video recording system may be used anywhere it is desirable to automatically record events within the viewing range of the camera operator.

The portable video recording system includes a camera (video sensor) for receiving video images, a microphone (audio sensor) for receiving audio signals and a recorder system for recording the received video and audio signals, and a power pack. The system is attached to an operator so that images within the operator's line of sight and sounds within the operator's hearing range are automatically tracked and recorded. The video and audio sensors (optional: stereo) transmit the video and audio signals to the recorder unit. The recorder unit typically records both the image and sounds onto a single magnetic tape. The video recording system also includes a separate power supply detached from the sensor and recording units. The power supply holds enough batteries to operate the system for extended amounts of time.

The video sensor includes a wide angle lens to allow clear recordation of events and images within the operator viewing range. An optional light could be used to indicate that the video recording system is activated. The sensors, recording unit, and power supply are coupled together with cables that transmit information and power between the various units. The cables are sized to allow maximum operator flexibility. The video recording system along with the cables are arranged so that the operator can quickly and easily strap on or remove the entire recording system. For example, in one embodiment of the invention, the entire recording system is attached to a jacket that is simply slipped on over the operator.

The various components of the video recording system are attached separately at different locations about the operator so that the system automatically tracks the viewing range of the operator while at the same time evenly distributing the overall weight of the system. For example, in one embodiment of the invention, the video and audio sensors are attached to a hat worn by the operator. The sensors attach onto and extend out from the front end of the hat to automatically receive video and audio information in the forward looking direction of the operator. The video recording system components are also attachable to other locations on the operator, such as on the shoulders, to accurately record events occurring within the front viewing range of the operator.

One embodiment of the invention uses VELCRO for attaching the sensors, recorder system and power supply to the operator. VELCRO allows the various units of the system to be attached at locations that increase both the mobility of the camera operator and the overall functionality of the video recording system.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 is a front view of a first embodiment of a portable video recording system attached to the hat and belt of an operator.

FIG. 2 is a front view of a second embodiment of the video recording system attached on a jacket.

FIG. 3 is a side view of the video recording system of FIG. 1 shown being used for police applications.

FIG. 4 is a side view of the video recording system of FIG. 2 shown being used during personal activities.

DETAILED DESCRIPTION

FIG. 1 is a front view of a first embodiment of a portable video recording system 14 attached to an operator 12. The portable video recording system includes a sensor unit 18 coupled by a cable 25 to a recorder unit 26, and the recorder unit 26 is connected to a power supply 28. The sensor unit 18 includes video sensor 24, audio sensor 20, and an activation indicator 22. The sensor unit 18 is attached to the front of a hat 16. The power supply 28 and the recorder unit 26 are attached to a belt 30.

The video sensor 24 typically includes a wide angle lens 27 for clearly recording as much area as practical in front of operator 12. The image received through lens 27 is transmitted through cable 25 to recorder unit 26 where the video signal is recorded onto a video tape. Audio sensor 20 transmits sounds (optionally in stereo) within the hearing range of the operator 12 to the recorder unit 26. The video and audio signals are recorded onto the same tape within recording unit 26. Alternatively, if only a video sensor is used, recording unit 26 can be used solely for recording video signals.

Power supply 28 typically comprises a battery pack of alkaline batteries or a rechargeable battery. Since the battery pack is located on the operator's belt, batteries can be replaced quickly and easily while the video recording system 14 remains attached to operator 12. The battery pack 28 powers recording unit 26, video sensor 24, audio sensor 20, and (optional) activation indicator 22. The battery pack 28 is sized to contain a sufficient battery capacity so that the video recording system can operate throughout the intended activity. Present state-of-the-art allows approximately two hours of high-resolution video, or six hours of modest-resolution video. Thus, a practical battery capacity maximum is two or six hours. For example, a television news crew would require a large battery pack to operate the video recording system for extended periods.

Operating the video recording system 14 continuously for many hours requires a larger energy storage capacity. Therefore, the power supply is sized to hold enough batteries to power the video recording system for an extended period of time. Alternatively, the video recording system may be used for shorter amounts of time, for example, to record a picnic. Therefore, a smaller, easier to carry battery pack can be attached to the video recording system that provides sufficient charge for only a fraction of the tape capacity.

In the same manner, the magnetic tape inside recorder unit 26 records either for a standard two hour period or records at a slower speed to extend recording time. For example, for extended play, the recorder unit 26 is set to a slow extended play recording of six hours. Thus, the system can be operated for a longer period of time without having to replace tapes. Since the recording unit is attached to the belt, tapes are quickly and easily replaced.

A switch 32 on recorder unit 26 controls video and audio recording and illuminates activation indicator 22. Switch 32 is located on recorder unit 26 for quick system activation. For automatic activation, switch 32 is sound activated and relocated on camera 18. The operator then shouts a command that automatically triggers switch 32 and in turn activates the video recording system 14.

Since camera 18 is attachable to hat 16, the video sensor 24 is directed toward the images that appear within the viewing range of the operator 12. For example, when operator 12 turns his head, video sensor 24 moves in the same direction automatically recording events within the operator's viewing direction. In addition, because the audio sensor 20 is also located on the operator's hat 16, sounds audible to the operator 12 are also recorded by the video recording system 14. For example, audio sensor 20 is located close to the ears of the operator. Therefore, if operator 12 moves closer to something, such as bending over to hear someone whispering, audio sensor 20 is also moved closer to the source of the sound. Thus, the chances of clearly recording the conversation are increased. The sensor unit 24 can be attached equally as well to a helmet, headband, or any alternate headwear.

The activation indicator 22 is typically a light emitting diode (LED) that is illuminated when the system is activated. The LED is used to inform people that they are presently being videotaped. The LED can also be used with a separately controllable switch to illuminate in different situations. Depending on the application, it may be advantageous to notify someone that they are being videotaped. For example, if the video recording system is being used by policemen, some localities may have legal considerations which require that a suspect be notified before being videotaped. Therefore, by activating the LED, the suspect is made aware that they are being videotaped.

The cable 25 contains conductors for both the control circuitry, power distribution, and video and audio signals.

The cable 25 is connected to the various components of the video recording system 14 to provide the operator 12 with maximum freedom of motion. For example, the cable 25 is long enough for the head of operator 12 to turn at any naturally occurring angle. Further, the cable 25 is sized to allow the operator 12 to perform any normal activity such as lifting, sitting, or running. Cable 25 runs down the back of operator 12 and if necessary connects to specific locations on the operator's shirt. Alternatively, cable 25 can be wired inside garments as is described below in FIG. 2.

The video and audio cameras, the battery pack and tape recording unit and activation switch are all components that are known to those skilled in the art and are, therefore, not described in detail.

FIG. 2 is a front view of a second embodiment of video recording system 14 shown attached to a jacket or vest 34 that contains epaulets 36 and 38 and pockets 40 and 42. The video sensor 24 attaches onto epaulets 38 and audio sensor 20 attaches to epaulet 36. Pocket 40 holds battery pack 28 and pocket 42 holds recording unit 26. Cable 25 is sewn inside the lining of jacket 34. Thus, the entire video recording system 14 is easily mounted onto operator 12 simply by donning jacket 34.

The video sensor 24 when attached on top of the shoulder continues to automatically track the frontal viewing range of operator 12. In addition, the audio sensor 20 remains relatively close to the operator's ear so that the audio sensor automatically follows the specific body motions of operator 12 that allow sounds to be heard and correspondingly recorded with more clarity.

Jacket 34 can be used in coordination with the specific occupation of operator 12. For example, in police operations, jacket 34 doubles as a bullet proof vest or as part of a standard police uniform. Alternatively, jacket 34 may double as a standard medical jacket worn by emergency medical personnel.

The various components of the video recording system 14 easily attach and detach onto jacket 34. For example, the video and audio sensors are attached to the epaulets 36 and 38 with VELCRO or alternative attachment means such as straps or clips, and the power supply 28 and recorder unit 26 located inside pockets 40 and 42, respectively. VELCRO allows the separate components to be located around other items that may be draped on the operator 12. For example, if the operator wears a gun holster, the power supply 28 or the recorder unit 26 can be easily reattached at a different location to prevent interference with gun access.

Alternatively, the VELCRO attachments can be supplemented with snaps to further support the components in severe environmental conditions or when the operator is performing extreme physical activity. For example, if the operator is running in the rain, the VELCRO attachments in conjunction with the snaps provide sufficient support to hold the components securely on the operator.

An important feature of the video recording system 14 is that the components are attached at locations about the operator so that weight is evenly distributed. Typical video recording system units have the video sensor, tape recording unit, and power supply contained within a single unitary housing. Since the weight of standard video recording systems are compacted within one unit, it is difficult to operate the unit continuously for extended periods of time. Even if the video recording system were carried in a backpack, the operator's center of gravity is offset making it more difficult to walk, run, and in general move while carrying the video recording system.

Video recording system 14 however, distributes the weight of the various camera components about the operator. For example, as shown in FIGS. 1 and 2, the power supply 28 is located on a left side of the operator defined as a first side and the recording unit is located on a right side of the operator defined as a second side. The entire system can then be carried for extended periods of time without significant effort and allows easier operator movement when performing different tasks.

Overall operation of the video recording system 14 is now explained. Referring to FIG. 3, the video recording system 14 of FIG. 1 is shown carried by a police officer 46. The police officer 46 activates the video recording system while on patrol, thereby automatically recording anyone that comes into the video sensing area 48. The camera 18 has a wide angle lens 27 (FIG. 1) that detects most if not all, of the suspect 44.

Since the camera 18 is directed out the front of the operator's hat, the video recording system 14 automatically tracks suspect 44. For example, suspect 44 may move to either side of police officer 46. To maintain visual contact, police officer 46 moves his head in the direction of the suspect 44. Accordingly, the camera 18 tracks the head movements of police officer 46 maintaining a constant surveillance on suspect 44. Thus, police officer 46 records the activities of suspect 44 while his hands are free to perform other tasks.

As mentioned above, the video recording system 14 includes a LED 22 (FIG. 1) that is illuminated when the video recording system 14 is activated. Since suspect 44 is notified by the activated LED that the incident is being recorded, he is less likely to attack or use abusive language directed toward police officer 46. Thus, it is less likely that altercations will occur during police arrests. In addition, because the entire incident is being recorded, the police officer has documented evidence to defend against claims made by suspect 44 of police brutality, and the question of whether or not rights were explained to suspect 44 is clearly documented.

Since the separate components are distributed evenly around the police officer, the video recording system 14 can be carried for an entire police shift without significant fatigue. Also, because the separate components of the system can be attached on the belt 30 or on the front of jacket 34, the police officer can drive a squad car while the video recording system is still attached. Thus, an operator, such as emergency medical personnel, can continuously operate the video recording system even if sitting in an emergency vehicle.

FIG. 4 is a side view of the video recording system of FIG. 2 shown being used for personal activities. The jacket 34 contains all of the separate components of the video recording system 14. The operator simply dons the jacket 34 and activates the system with control switch 32 (FIG. 1). The video sensor 24 is angled according to the height of operator 50 so the desired area 52 within the operator's viewing range is recorded. Because the video and audio sensors (FIG. 2) are located on the shoulders of the operator, the video recording system automatically follows the child's movements via the operator. For example, when the operator 50 bends down to watch or hear a child 54, the video and audio sensors follow the operator's path down to the child 54, thereby, increasing clarity of the video and audio recordings made by the video recording system.

Thus, the video recording system 14 provides automatic video and audio tracking while keeping the hands of the operator free to perform other tasks. In addition, the system provides a wide array of attachment configurations that reduce the weight burden and increase operator dexterity while operating a video recorder.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A portable video recording system for use on an operator having a given visual line of sight for observing various objects and events therein, comprising:
    a video sensor for receiving video images;
    a recorder unit coupled to the video sensor for recording the received video images, the recorder unit located on a first side of the operator;
    a power supply coupled to the recording unit while also being physically spaced from the recorder unit, the power supply located on a second side of the operator opposite to the first side thereby balancing weight of the recorder unit and the power supply between the first and second sides of said operator; and
    means for attaching the video sensor, power suppy and the video recorder unit on the operator so that images within the operator's line of sight are automatically tracked and received by the video sensor independently of the operator's hand motions, the video sensor readily identifiable by others after being attached on the operator for deterring violent behavior against said operator.

2. A video recording system according to claim 1 including an audio sensor coupled to the recorder unit, the video sensor attached to a first shoulder of a garment worn on the operator and the audio sensor attached to a second shoulder of the armament worn by the operator so that sounds within a given operator hearing range are automatically tracked by the audio sensor while at the same time distributing weight of the video sensor between the first and second shoulder.

3. A video recording system according to claim 2 wherein the armament includes first and second epaulets located on the first and second shoulder, respectively, wherein the video sensor is attached on the first epaulet on the first shoulder and the audio sensor is attached to the second epaulet of the second shoulder of the garment worn by the operator.

4. A video recording system according to claim 1 including a light-weight cap worn on top of the operator's head, the video sensor readily attachable and detachable onto a front end of said cap thereby permitting an unobstructed view of images viewed by the operator.

5. A video recording system according to claim 4 including a light coupled to the video sensor and readily attached and detached to the front of the cap for readily indicating to a person coming in contact with the operator that the video recording system is activated.

6. A video recording system according to claim 1 wherein the power supply is located on a left side of the operator and the video recorder unit is located on a right side of the operator.

7. A video recording system according to claim 6 wherein the power supply and recorder unit are attached to the operator so that weight of the video recording system is optimally distributed on the operator.

8. A video recording system according to claim 6 wherein the attaching means includes a jacket worn by the operator, the jacket having means for holding the power supply, video sensor and recorder unit while at the same time being readily put on and disrobed from the operator, the recording system thereby automatically mounted onto the operator by donning said jacket.

9. A video recording system according to claim 1 wherein the video sensor includes a wide angle lens for allowing the recordation of events and images within the viewing range of the operator.

10. A video recording system according to claim 1 wherein the means for attaching the video sensor and the recorder unit onto the operator comprise VELCRO attached to various locations on the operator's clothing.

11. A portable video recording system comprising:
    a video sensor for receiving video images;
    an audio sensor for receiving sounds;
    a recorder unit for recording signals from the video and audio sensors;
    a jacket for fitting on an operator; and
    means for attaching the video sensor, audio sensor and recorder unit on the jacket so that when the operator puts on the jacket, images within the operator's line of sight are automatically tracked and received by the video sensor independently of the operator's hands and the weight of the video recording system is evenly distributed on the operator.

12. A video recording system according to claim 11 including a voice activated switch for activating the video recording system when in a deactivated state, the switch turning on the video recording system when an audio signal is received from the operator.

13. A video recording system according to claim 11 including VELCRO and snaps attached onto the jacket, the VELCRO and snaps operating in coordination to adhere the sensors and recording unit securely onto the jacket.

14. A method for recording objects and events with a portable video recording system, comprising:
    providing a video recording system having separately detachable components including a video sensor for receiving image information, an audio sensor for receiving sound information, a recorder unit for recording the images and sounds received by the video and audio sensors, a power supply and a control unit for activating the video recording system;
    attaching the video recording system to an operator having a given line of sight so that objects and events along the operator's line of sight are automatically tracked by the video sensor and recorded by the recorder unit independently of the operator's hands; and
    distributing weight from the recording system components evenly about the operator thereby reducing strain on said operator when carrying said recording system while at the same time allowing the operator to maintain a given mobility for running and various additional physically strenuous activities.

15. A method according to claim 14 wherein attaching the video recording system to the operator includes locating the video sensor and the audio sensor next to the operator's head, locating the power supply at a first side of the operator and locating the video recorder at a second side of the operator opposite to the first side.

16. A method according to claim 14 including attaching the video and audio sensors on at least one shoulder of the operator.

17. A method according to claim 14 wherein the operator is a police officer and including using the video recording system to record events that occur while said police officer is on patrol while at the same time using the recording system as a deterrent for aggressive behavior against the police officer wherein easy identification of the recording system by a person other than the operator tend to restrict behavior by the person's knowledge that their actions are being recorded.

18. A method according to claim 14 indicating to a person coming in contact with the operator that the video recording system is actuated.

\* \* \* \* \*